United States Patent
Wegmann et al.

(10) Patent No.: US 8,917,702 B2
(45) Date of Patent: Dec. 23, 2014

(54) METHOD AND DEVICE FOR DATA PROCESSING IN A WIRELESS NETWORK

(75) Inventors: Bernhard Wegmann, Holzkirchen (DE); Dirk Rose, Munich (DE); Richard Waldhauser, Munich (DE); Ingo Viering, Munich (DE); Krzysztof Kordybach, Pulawy (PL)

(73) Assignee: Nokia Siemens Networks Oy, Espoo (FI)

( * ) Notice: Subject to any disclaimer, the term of this patent is extended or adjusted under 35 U.S.C. 154(b) by 116 days.

(21) Appl. No.: 13/642,161

(22) PCT Filed: Apr. 19, 2010

(86) PCT No.: PCT/EP2010/055125
§ 371 (c)(1),
(2), (4) Date: Dec. 3, 2012

(87) PCT Pub. No.: WO2011/131225
PCT Pub. Date: Oct. 27, 2011

(65) Prior Publication Data
US 2013/0070679 A1    Mar. 21, 2013

(51) Int. Cl.
*H04W 4/00* (2009.01)
*H04W 36/00* (2009.01)
*H04W 92/20* (2009.01)

(52) U.S. Cl.
CPC .......... *H04W 36/0083* (2013.01); *H04W 92/20* (2013.01)

USPC .......................................................... 370/331

(58) Field of Classification Search
None
See application file for complete search history.

(56) References Cited

U.S. PATENT DOCUMENTS

| | | | |
|---|---|---|---|
| 2009/0274086 A1* | 11/2009 | Petrovic et al. | 370/312 |
| 2011/0026484 A1* | 2/2011 | Fox et al. | 370/331 |
| 2011/0103347 A1* | 5/2011 | Dimou | 370/331 |

FOREIGN PATENT DOCUMENTS

| | | | | |
|---|---|---|---|---|
| EP | 2 166 796 A1 | 3/2010 | | |
| WO | WO-2008/040962 A1 | 4/2008 | | |
| WO | WO 2008/040962 A1 | 4/2008 | | |
| WO | WO 2008040962 A1 * | 4/2008 | ............ | H04W 60/00 |
| WO | WO 2009/123512 A1 | 10/2009 | | |
| WO | WO-2010/000328 A1 | 1/2010 | | |
| WO | WO 2010/000328 A1 | 1/2010 | | |
| WO | WO 2010000328 A1 * | 1/2010 | ............ | H04W 36/00 |

OTHER PUBLICATIONS

3GPP TS 25.331 V9.1.0 (Dec. 2009); "3rd Generation Partnership Project; Technical Specification Group Radio Access Network; Radio Resource Control (RRC); Protocol Specification (Release 9)"; Dec. 2009; whole document (1759 pages).

(Continued)

*Primary Examiner* — Clemence Han
(74) *Attorney, Agent, or Firm* — Harrington & Smith

(57) ABSTRACT

A method and a device for data processing in a wireless network including several base stations are provided, wherein a mobility information is conveyed between at least two base stations. Furthermore, a communication system is suggested including at least one such device.

17 Claims, 1 Drawing Sheet

(56) References Cited

OTHER PUBLICATIONS

3GPP TS 36.300 V8.0.0 (Mar. 2007); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2007; whole document (82 pages).

3GPP TS 331 V9.2.0 (Mar. 2010); "3rd Generation Partnership Project; Technical Specification Group Radio Access Network; Evolved Universal Terrestrial Radio Access (E-UTRA); Radio Resource Control (RRC); Protocol specification(Release 9)"; Mar. 2010; whole document (248 pages).

* cited by examiner

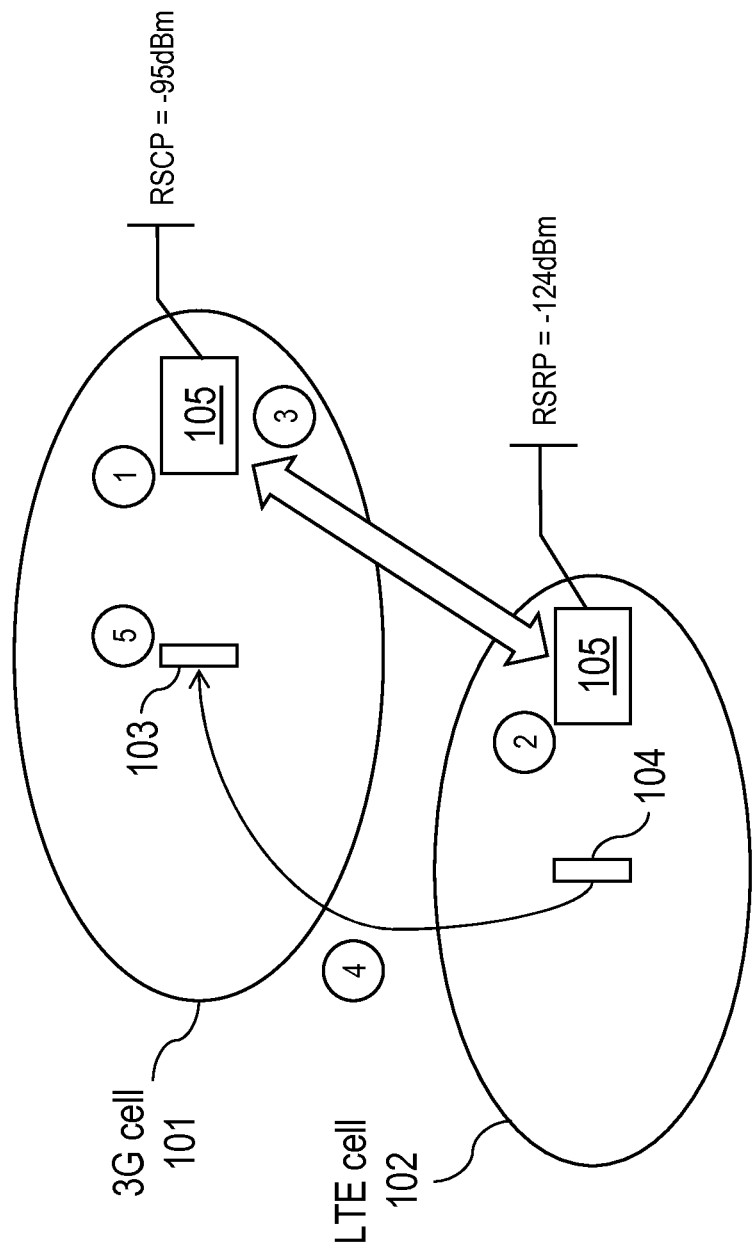

METHOD AND DEVICE FOR DATA PROCESSING IN A WIRELESS NETWORK

The invention relates to a method and to a device for data processing in a wireless network. Also, a communication system comprising at least one such device is suggested.

Most LTE operators already maintain 3G and 2G networks, which are of different radio access technologies (RATs). It may be beneficial to move mobile terminals from one RAT to another (utilizing handover in case the mobile terminal is in an active mode or re-selection in case the mobile terminal is in an idle mode), e.g., because of at least one of the following reasons:

a) Radio reasons: If the radio quality in a serving RAT deteriorates, the mobile terminal can be handed over to another RAT in case this new RAT provides sufficient radio quality. This scenario may be applicable, e.g., with an LTE network deployed in an early stage or in case of LTE hotspots being deployed within a 3G network providing macro coverage.

b) Service reasons: Particular services may prefer a certain RAT. For example, voice may be conveyed via the 2G or 3G network (e.g., during an early LTE implementation stage) and data services can be delivered via LTE or 3G.

c) Re-selection priorities: With the LTE being in (stable) operation, the mobile terminal may camp on the LTE network whenever it provides sufficient radio quality.

d) Load Balancing reasons: The traffic load could be distributed among the various RAT networks, e.g., handovers may be initiated from a first RAT to a second RAT in case the first RAT is heavily loaded and the second RAT has idle capacity.

With regard to LTE as an example, inter-RAT mobility also depends on the following parameters (mobility parameters):

i) A radio handover (in particular due to coverage reasons) is triggered in case a signal strength of a serving cell falls below a first threshold and a signal strength of another (neighboring) cell of a different RAT indicates sufficient radio signal strength above a second threshold.

ii) Cell re-selection of a mobile terminal
  is conducted to a RAT cell with a higher re-selection priority in case a signal strength received is above a given threshold $Thresh_{x,high}$ (x denoting any other, i.e., not the serving cell);
  is conducted to a RAT cell with equal or lower re-selection priority in case $$S_{serving} < Thresh_{serving,low} \text{ and } S_{nonserving} > Thresh_{x,low},$$

wherein S indicates a signal strength, "serving" indicates the actual serving cell and "nonserving" or "x" indicates the non-serving cell.

iii) Service or load-based handovers can be initiated (on demand, e.g., based on operator policies) by any of the network elements eNB, RNC, BSC.

It is noted that these procedures are similar in 2G and 3G networks. The mobility parameters indicated above are cell-specific parameters and may thus vary from cell to cell.

Preferably, the mobility parameters are configured such that
  no radio link failures and/or call drops occur (in active mode);
  no out of service events occur (in idle mode); and
  no ping-pong effects (unnecessary handovers forth and back between different RAT cells) occur (in both active and idle mode).

As indicated, ping-pong effects are critical in the inter-RAT scenario and there is a significant risk of losing data packets due to such inter-RAT ping-pong effects in case the mobile terminal is in connected mode. Also, paging attempts may be missed when the mobile terminal is in idle mode due to such ping-pong effects.

Inter-RAT ping-pong events may occur due to the following scenarios:

1) Mobility parameter configurations of the different RAT cells are inconsistent, e.g.,
  in case the re-selection priorities are not consistent throughout the RAT cells; for example, in LTE, 3G can be prioritized and vice versa (this leads to changing the RAT between LTE and 3G back and forth.);
  in connected mode, if a threshold in the target cell is larger than a corresponding threshold in the source cell; due to slow and fast signal fluctuation, ping-pong switching can even occur if the thresholds are too close;
  in case the mobile terminal re-selects to a higher prioritized RAT cell (with a signal strength above a threshold $Thresh_{x,high}$), whereas this RAT cell is already close to its coverage limit (hence, the threshold $Thresh_{serving,low}$ will be reached soon after re-selection which leads to a re-selection (ping-pong) back to the first cell.

2) Service or load based handovers can be initiated towards a RAT cell that is already close to its coverage limit.

The problem to be solved is to overcome the disadvantages stated above and in particular to provide a solution that avoids or reduces unnecessary handover or re-selection between cells.

This problem is solved according to the features of the independent claims. Further embodiments result from the depending claims.

In order to overcome this problem, a method for data processing in a wireless network comprising several base stations is provided,
  wherein a mobility information is conveyed between at least two base stations.

It is noted that said base station may comprise a base station controller, an eNB according to LTE, a RNC or a BSC. It is also noted that the base station may comprise or be associated with a control unit of a base station. The base station may further be an element of a wireless network that can be connected to a mobile terminal via a radio link.

The approach provided advantageously allows mobility robustness optimization (MRO) in particular with regard to self-optimizing networks.

Hence, the approach allows distributing mobility information across various cells, e.g., different RAT cells or cells using different frequencies.

Advantageously, the approach provided allows improving a network's stability as the mobility parameters can be configured and automatically optimized in a de-centralized manner on a network element level by conveying this mobility information between the network elements. Thus, the approach allows checking or being informed of an adjacent node's mobility settings without any need for centralized supervision for each node of the network.

Thus, manual configurations or complex adjustments may no longer be necessary or can be significantly reduced. This reduces costs as the manual supervision of performance indicators as well as manually solving mobility problems (between different RAT cells) is no longer required or can be tremendously reduced.

In an embodiment, the mobility information comprises at least one of the following:
  a mobility parameter;
  a mobility setting;
  a mobility configuration;
  re-selection priorities;

handover parameters, in particular threshold values that indicate whether or not a handover of a mobile terminal can be initiated;

re-selection parameters, in particular threshold values that indicate whether or not a re-selection of a mobile terminal can be initiated.

The mobility information mentioned may comprise radio information that has in particular so far been configured or maintained by at least one OAM instance.

Being aware of the mobility parameters may help the cell to make an improved handover and/or re-selection decision. For example, uninformed handover or re-selection events may lead to ping-pong effects, which according to the solution presented can be determined and thus avoided.

In another embodiment, at least two of the base stations are of different radio access technologies.

It is noted that the radio access technologies (RATs) comprise in particular: 2G (GSM, GPRS), 3G (UMTS, HSPA) and LTE networks.

Handling a lot of different radio access technologies, operators benefit from a tight interworking of the different RATs thereby allowing at least partially a self-optimizing network approach hence significantly reducing operational costs.

In a further embodiment, the mobility information is conveyed or exchanged via at least one of the following means:

an amended existing or a new procedure;

an information element that is added to an existing or new procedure;

an information element that is added to an existing container to be transparently conveyed across a core network;

a RIM framework.

In a next embodiment, at least two of the base stations are of the same radio access technology and utilize different frequencies.

Hence, the solution provided is also applicable to an inter-frequency scenario in the same RAT. In such case, when LTE is being used as RAT, an X2 interface can be used for communication purposes between different base stations.

It is also an embodiment that the mobility information is conveyed from a first base station to a second adjacent base station.

It is noted that the base stations may be located adjacent, co-located or near to one another. The base stations may convey information unidirectional or bi-directional. The first and second base station may in particular exchange mobility information, preferably together with protocol information (which enables handshaking mechanisms, failure handling, etc.).

Pursuant to another embodiment, the mobility information conveyed between at least two base stations comprises a minimum radio quality level below which a mobile terminal experiences synchronization problems.

According to an embodiment, the mobility information is conveyed substantially periodically, in particular according to a given time scheme.

According to another embodiment, the mobility information is conveyed based on an event comprising in particular at least one of the following:

an inter-frequency handover;

a handover between different radio access technologies;

a re-selection between different radio access technologies;

a change of mobility information;

a failed handover;

a failed re-selection;

a ping-pong event.

In yet another embodiment, the mobility information conveyed comprises a request to change the mobility information of the base station addressed.

Based on the mobility information provided from one base station to another, the base station addressed may respond accordingly confirming the request, rejecting the request, or sending another request back (with a different change). Also, a protocol can be established to ensure that mobility information conveyed between base stations is correctly received or—in case a failure occurs—that such failure can be recognized based on failure handling mechanisms (timeout, missing acknowledgments, etc.).

According to a next embodiment, the base station receiving the mobility information adjusts its mobility information or a portion thereof.

Hence, the mobility information conveyed can be used by the base station addressed to modify its mobility information or a portion thereof, e.g., its mobility configuration or parameters. For example, the base station receiving the mobility information may adjust threshold values in order to avoid ping-pong events.

Pursuant to yet an embodiment, the base station receiving the mobility information adjusts its mobility information or a portion thereof by adding a safety margin or hysteresis.

Such safety margin or hysteresis can be used to avoid ping-pong effects and thus to efficiently use interworking of networks of different RATs or different frequencies.

The problem stated above is also solved by a base station for data processing in a wireless network comprising a processing unit that is arranged for conveying a mobility information towards at least one (other) base station.

According to an embodiment, said device is an eNB, a RNC or a BSC.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

Furthermore, the problem stated above is solved by a communication system comprising at least one device as described herein.

Embodiments of the invention are shown and illustrated in the following figure:

FIG. 1 shows a schematic diagram of two adjacent cells, wherein the one cell is a 3G cell with an RNC and the other cell is an LTE cell with an eNB.

It is suggested conveying mobility information (e.g., parameters, settings, configurations, etc.) between cells, in particular between network elements of different cells. The cells may be of different or of the same RAT. The network element in this regard comprises any entity that is part of the cell or that is (logically) associated with the cell. The network element may in particular be a base station, an eNB, an RNC, a BSC or the like.

It is noted that the cell referred to herein may also refer to the actual network element or (network) node that controls radio parameters (also referred to as mobility parameters) of the cell, i.e. the eNB in LTE, the RNC in 3G and the BSC in 2G.

Hence, the approach provided in particular bears the following advantages:
   a) The network element has more information about the radio interface than a (centralized) OAM instance. Hence, the network element based on the mobility parameters from adjacent network elements (of other cells) may make a well informed decision regarding the configuration or adjustment of mobility parameters.
   b) The network element is able to react much faster than the OAM instance. Any OAM instance typically waits until sufficient data has been collected that statistically indicates a situation that requires some adjustments of the mobility parameters. According to the solution provided herein, the network element may act faster and (if this is required) even on a single event basis.
   c) The network element solving a network problem locally keeps a significant amount of computational overhead from the OAM instance.
   d) Also, the decentralized approach suggested enables handling, configuring and/or optimization of more mobility parameters compared to the centralized approach directed towards the OAM instance.

Hence, the base station or a control unit of a base station may convey mobility information to another base station or control unit. These network elements may in particular exchange mobility information.

The mobility information comprises, e.g., mobility configuration and/or mobility parameter settings.

The base station or base station control unit can inform its inter-frequency or inter-RAT neighboring cells (i.e. base stations or base station control units) about, e.g., a minimum radio quality level (e.g., RSRQ, $E_c/N_0$, etc.) below which a mobile terminal (also referred to as user equipment (UE)) will run out of synchronization ($E_c/N_0$ is the energy per bit to noise spectral density ratio).

A particular cell may inform an adjacent inter-frequency or inter-RAT cell about its current mobility parameter settings that are related to this frequency or RAT or about a portion or subset of such parameter settings, e.g. at least one of the following:
   a) Re-selection priorities (that may not be consistent; e.g., in LTE, 3G is prioritized or vice versa);
   b) Handover parameters: threshold values (e.g., first threshold value for the serving cell and second threshold value for the neighbor cell: If the signal strength falls below the first threshold value for the serving cell and the neighbor cell supplies a signal strength above the second threshold value, handover may be initiated);
   c) Re-selection parameters: threshold values (e.g., $Thresh_{x,high}$, $Thresh_{serving,low}$, $Thresh_{x,low}$, re-selection priorities, etc.).

Being aware of the mobility parameters may help the cell to make an improved handover and/or re-selection decision. For example, uninformed handover or re-selection events may lead to ping-pong effects, which according to the solution presented can be determined and thus avoided.

The mobility information can be conveyed and/or exchanged periodically. Also, transmitting or exchanging mobility information can be triggered by certain events, e.g., an inter-frequency or an inter-RAT handover, a change of a mobility parameter, a failed handover, a ping-pong effect, etc.

Also, a mechanism can be introduced according to which a cell proposes a change of the mobility parameters in another frequency or RAT to at least one of its neighboring cells.

In addition, a response can be provided accordingly by the cell that has been informed about a mobility parameter or a change of a mobility parameter. Hence, a communication between the cells, e.g., base stations or base station control units of different cells, can be provided comprising, e.g., handshaking mechanisms, acknowledgments, failure handling (timeout handling, re-sending of messages, discarding messages), etc.

If LTE cells are involved using different frequencies, the mobility information may be conveyed or exchanged via an X2 interface.

If the cells involved are of different RATs, the mobility information can be conveyed or exchanged according to at least one of the following means:
   a) New procedures can be introduced;
   b) Information Elements (IEs) can be added to existing procedures (e.g., 2G or 3G handover piggybacking can be used);
   c) IEs can be added to existing containers that are transferred transparently through the core network (e.g., like in 2G or 3G handover piggybacking);
   d) Using a RAN information management (RIM) framework (e.g., as planned to be realized for an inter-RAT load balancing feature of self-optimizing networks).

As an alternative or in addition, a certain behavior of a cell receiving the mobility parameters of an adjacent cell can be specified or recommended. Thus, a value of a mobility parameter referring to a signal quality in another RAT cell may consider (or be combined with) mobility parameters received by a neighbor of this RAT cell. For example, a threshold parameter TH2 (indicating a lower threshold that has to be exceeded in order to initiate a handover to a target cell) in one LTE cell can consider at least one threshold parameter TH1 (indicating a lower threshold which when reached or fallen below triggers a handover) received from its 3G neighboring cell(s).

Furthermore, a hysteresis Hst could be added, e.g., TH2=TH1+Hst, wherein the parameter Hst can be configured by the OAM instance.

FIG. 1 shows a schematic diagram of two adjacent cells 101, 102, wherein the cell 101 is a 3G cell with an RNC 103 and the cell 102 is an LTE cell with an eNB 104.

The ping-pong scheme and how to avoid it can be described as follows:
   (1) In the beginning, a mobile terminal 105 is connected to the 3G cell 101. The RSCP (signal strength of 3G cell) of the mobile terminal 105 at this location amounts to −95 dBm, the RSRP (signal strength of LTE cell) amounts to −124 dBm.
   It is assumed that the 3G cell 101 implements a policy to handover the mobile terminal to the LTE cell 102 (e.g., due to service reasons) in case coverage of the LTE cell 102 is available, i.e. RSRP>−125 dBm (even though coverage of the 3G cell 101 may still be good).
   (2) As the RSRP determined amounts to −124 dBm, the condition (RSRP>−125 dBm) is true and the 3G cell 101 initiates the handover to the LTE cell 102.
   It is assumed that the LTE cell 102 applies the following policy: A handover to the 3G cell 101 is to be conducted if the coverage of the LTE cell 102 (i.e. its RSRP) deteriorates below −123 dBm and if the coverage of the 3G cell 101 is deemed sufficient, i.e. the RSCP>−108 dBm.
   It is noted that the value −123 dBm is chosen with a margin, because inter-RAT measurements may have some delay (measurement gaps are needed).
   (3) Hence, the LTE cell 102 initiates another (coverage) handover back to the 3G cell 101.
   (4) The solution provided herein allows the LTE cell 102 to inform the 3G cell 101 (actually the eNB 104 informs the RNC 103) about its handover parameter settings. This can be done, e.g., periodically (for example, every minute) or based on a ping-pong event detected. RIM or another mechanism could be used for conveying or exchanging (inter-RAT) mobility information such as said handover parameter settings.

It is noted that the LTE cell 102 is able to detect a ping-pong event, but it may not be aware of the reason. The 3G cell 101 may, however, not be aware of the ping-pong event, as it cannot recognize the mobile terminal 105 in case the UE context has yet been released (which is typically the case after a successful handover has been conducted).

(5) The RNC 103 receives the handover parameters from the eNB 104 and may thus realize that the RSRP threshold set to represent the LTE coverage condition should be increased (5).

This could be done stepwise, e.g., by 1 dB, 2 dB or by an absolute value based on the LTE parameters conveyed from the eNB 104, e.g., $$-123 \text{ dBm} + Hst,$$

wherein Hst indicates a hysteresis which can either be an internal parameter or a parameter configured by an OAM instance.

It is noted that the steps (1) to (5) are also shown in FIG. 1. Furthermore, the action pursuant to step (5) may be open to implementation and may thus be vendor-specific. Alternatively, to some extent, this action can be globally specified.

It is further noted that the entities shown in FIG. 1 could be implemented by a person skilled in the art as various physical units, wherein the mobile terminal or the base stations or cells could be realized as or associated with at least one logical entity that may be deployed as hardware, program code, e.g., software and/or firmware, running on a processing unit, e.g., a computer, microcontroller, ASIC, FPGA and/or any other logic device.

The functionality described herein may be based on an existing component of a (wireless) network, which is extended by means of software and/or hardware. The base station mentioned herein could also be referred to as any base station, base transceiver station or base station controller pursuant to any communication standard.

The base station may comprise at least one logical or physical processing unit that is arranged for conveying a mobility information towards at least one base station.

LIST OF ABBREVIATIONS

3GPP 3rd Generation Partnership Project
BSC Base Station Switching Center
BTS Base Station Transceiver System
eNB evolved NodeB (base station)
GPRS General Packet Radio Service
GSM Global System for Mobile Communications
HSPA High-Speed Packet Access
IE Information Element
LTE Long-Term Evolution
MRO Mobility Robustness Optimization
OAM Operation Administration and Maintenance
RAN Radio Access Network
RAT Radio Access Technology
RIM RAN Information Management
RNC Radio Network Controller
RSCP Reference Signal Code Power
RSRP Reference Signal Received Power
RSRQ Reference Signal Received Quality
SON Self Organizing Networks
UE User Equipment (mobile terminal)
UMTS Universal Mobile Telecommunications System
UTRAN UMTS Terrestrial Radio Access Network

The invention claimed is:

1. A method for data processing in a wireless network comprising several access nodes,
    wherein a mobility information is conveyed between at least a first access node controlling a first cell and a second access node controlling a second cell, for mobility robustness optimization directed to ensuring that completion of a first procedure for handover or reselection from the first cell to the second cell does not trigger a second procedure for handover or reselection from the second cell to a third cell, and
    wherein the mobility information comprises at least one of the following:
        a mobility parameter;
        a mobility setting;
        a mobility configuration;
        re-selection priorities;
        handover parameters;
        re-selection parameters;
        a minimum radio quality level below which a mobile terminal experiences synchronization problems.

2. The method according to claim 1, wherein at least two of the access nodes are of different radio access technologies or at least two of the access nodes are of the same radio access technology and utilize different frequencies.

3. The method according to claim 1, wherein the mobility information is conveyed periodically.

4. The method according to claim 1, wherein the mobility information is conveyed based on an event comprising at least one of the following:
    an inter-frequency handover;
    a handover between different radio access technologies;
    a re-selection between different radio access technologies;
    a change of mobility information;
    a failed handover;
    a failed re-selection;
    a ping-pong event.

5. The method according to claim 1, wherein the mobility information conveyed comprises a request to change the mobility information of the access node addressed.

6. The method according to claim 1, wherein the access node receiving the mobility information adjusts its mobility information or a portion thereof.

7. The method according to claim 1, wherein the access node receiving the mobility information adjusts its mobility information or a portion thereof by adding a safety margin or hysteresis.

8. The method according to claim 1, wherein the third cell is the first cell.

9. A computer program product embodied on a non-transitory computer readable storage medium in which a computer program is stored that, when being executed by a computer, is configured to provide instructions to control or carry out the method of claim 1.

10. An apparatus for an access node of a first radio access technology comprising at least one processor and at least one memory including computer program code, wherein the at least one memory and the computer program code are configured, with the at least one processor, to cause the apparatus to perform or control at least the following:
    to control a first cell and
    to convey a mobility information towards at least one second access node arranged to control a second cell,
        wherein the mobility information is conveyed for mobility robustness optimization directed to ensuring that completion of a first procedure for handover or reselection from the first cell to the second cell does not trigger a second procedure for handover or reselection from the second cell to a third cell, and wherein the mobility information comprises at least one of the following:
a mobility parameter;
a mobility setting;
a mobility configuration;
re-selection priorities;
handover parameters;
re-selection parameters;
a minimum radio quality level below which a mobile terminal experiences synchronization problems.

11. The apparatus according to claim 10, wherein said at least one second access node is an access node of a radio access technology different to the first radio access technology or is an access node of the first radio access technology and utilizes frequencies different to the frequencies of the first cell.

12. The apparatus according to claim 10 and the processing unit further arranged to convey mobility information periodically.

13. The apparatus according to claim 10 and the processing unit further arranged to convey mobility information based on an event comprising at least one of the following:
an inter-frequency handover;
a handover between different radio access technologies;
a re-selection between different radio access technologies;
a change of mobility information;
a failed handover;
a failed re-selection;
a ping-pong event.

14. The apparatus according to claim 10 and the processing unit further arranged to convey mobility information which comprises a request to change the mobility information of the access node addressed.

15. The apparatus according to claim 10 and the processing unit further arranged to receive mobility information and to adjust its mobility information or a portion thereof.

16. The apparatus according to claim 10, wherein the third cell is the first cell.

17. A method comprising:
conveying mobility information, for data processing in a wireless network of at least two access nodes, between a first access node controlling a first cell in the wireless network and a second access node controlling a second cell in the wireless network, wherein the mobility information comprises at least one of the following:
a mobility parameter,
a mobility setting,
a mobility configuration,
re-selection priorities,
handover parameters,
re-selection parameters, and
a minimum radio quality level below which a mobile terminal experiences synchronization problems;
in response to the mobility information, directing completion of a first procedure for handover or reselection from the first cell to the second cell; and
ensuring that the directing does not trigger a second procedure for handover or reselection from the second cell to a third cell in the wireless network.

\* \* \* \* \*